United States Patent
Lönneborg

(10) Patent No.: US 6,895,856 B1
(45) Date of Patent: May 24, 2005

(54) DEVICE AND METHOD FOR A HIGH PRESSURE PRESS

(75) Inventor: Nils-Gunnar Lönneborg, Västerås (SE)

(73) Assignee: Flow Holdings GmbH (SAGL) Limited Liability Company, (CH)

( * ) Notice: Subject to any disclaimer, the term of this patent is extended or adjusted under 35 U.S.C. 154(b) by 0 days.

(21) Appl. No.: 09/719,289

(22) PCT Filed: Jun. 4, 1999

(86) PCT No.: PCT/SE99/00963

§ 371 (c)(1),
(2), (4) Date: Feb. 23, 2001

(87) PCT Pub. No.: WO99/64144

PCT Pub. Date: Dec. 16, 1999

(30) Foreign Application Priority Data

Jun. 9, 1998 (SE) .................................. 9802069

(51) Int. Cl.[7] .............................................. B23P 17/00

(52) U.S. Cl. ..................... 100/35; 100/39; 29/421.1; 29/426.4

(58) Field of Search ............................ 100/214, 240, 100/245, 35, 269.05, 269.08, 269.18, 39; 29/446, 421.1, 895.1, 895.23, 895.21, 426.4, 29/426.1; 92/86.5, 89, 171.1

(56) References Cited

U.S. PATENT DOCUMENTS

| | | | | |
|---|---|---|---|---|
| 4,198,740 A | * | 4/1980 | Prevender | 228/115 |
| 4,328,959 A | | 5/1982 | Holtmann | 266/281 |
| 4,359,811 A | * | 11/1982 | Monroe | 29/421.1 |
| 4,377,894 A | * | 3/1983 | Yoshida | 29/421.1 |
| 4,449,281 A | * | 5/1984 | Yoshida et al. | 29/421.1 |
| 5,209,197 A | * | 5/1993 | Melchior | 123/193.3 |
| 5,287,621 A | | 2/1994 | Usui | 29/888.061 |
| 5,475,911 A | * | 12/1995 | Wells et al. | 29/33 T |
| 5,622,105 A | | 4/1997 | Bergman | 100/245 |
| 5,765,465 A | | 6/1998 | Gärdin et al. | 92/86 |

FOREIGN PATENT DOCUMENTS

| | | |
|---|---|---|
| EP | 0 013 927 A1 | 8/1980 |
| WO | WO 94/21370 | 9/1994 |
| WO | WO 95/21690 | 8/1995 |

* cited by examiner

*Primary Examiner*—Allen Ostrager
*Assistant Examiner*—Jimmy Nguyen
(74) *Attorney, Agent, or Firm*—Seed Intellectual Property Law Group PLLC

(57) ABSTRACT

A method to provide a high pressure press with a replaceable wear liner. The wear liner is first inserted into the cylindrical pressure chamber of the press and the pre-stressed by the application of an excess pressure above the yield point. The excess pressure is sufficient to increase the diameter of the wear liner and produce a residual radial compressive stress that holds the wear liner in place. When the wear liner is removed from the press it is dismantled. The advantage of the invention is that the replaceable wear liner, and a high pressure press comprising it, may be relatively inexpensive to produce and the replaceable wear liner may be quickly and simply replaced.

3 Claims, 2 Drawing Sheets

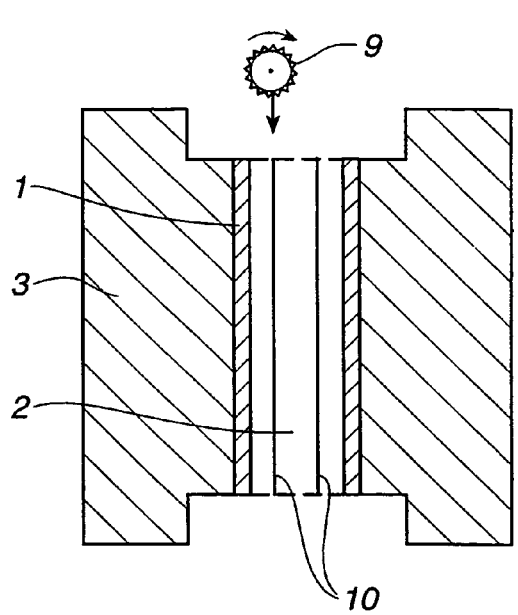
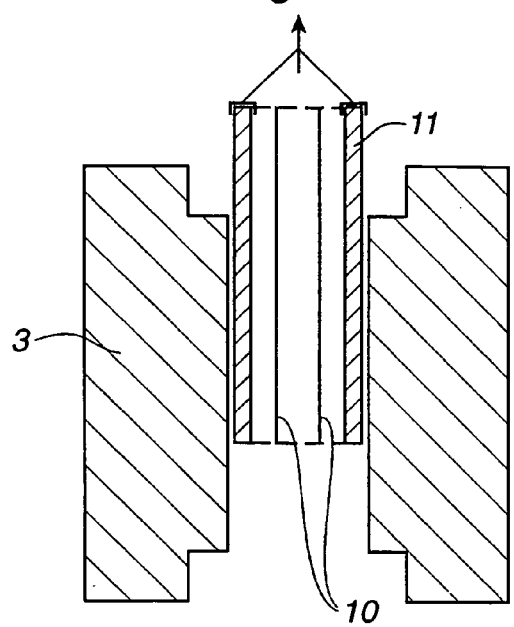

DEVICE AND METHOD FOR A HIGH PRESSURE PRESS

BACKGROUND OF THE INVENTION

1. Field of the Invention

The present invention relates to a device and method used in conjunction with high pressure presses in the areas of isostatic pressing and the high pressure treatment of substances. The present invention relates to a type of wear liner for use in high pressure presses and a method for fitting and replacing the wear liner.

2. Description of the Related Art

For some time now high pressure treatment has been used as a method for inactivating micro-organisms and certain enzymes in foodstuffs and other provisions. A decisive factor for obtaining a good result from a high pressure treatment is that the pressure is sufficiently high. During treatment of provisions, the pressure is usually set at a pressure between 1,000–15,000 bar. Inside high-pressure presses, the high working pressure is generated inside the innermost cylinder, or inner liner, that defines the pressure chamber. At such high pressures, the inner liner is subjected to very great fatigue stress. Liner failure unavoidably arises after some time in operation and so the inner liner is usually designed and made as a wear liner, which is replaceable. To avoid liner failure, the wear liner is regularly replaced well in advance of the estimated service life. Such liners are expensive and consequently economically disadvantageous. Further, each wear liner replacement constitutes a time consuming and costly process. PCT/SE95/000153 describes a particular type of wear liner, which is installed in a high pressure press of the pre-stressed wire-wound type.

Wear liners have to be replaced due to wear or fracture. The replacement operation includes a removal stage in which the wear liner is removed and an insertion stage in which a new wear liner is put in place. To remove a worn wear liner with, for example, a wire-wound press of the type described in PCT/SE95/000153, the piston part of the inner pressure intensifier of the press is arranged with specially adapted tools so that pressure can be brought to bear on the liner holder and the wear liner. Pressure from the inner pressure intensifier is applied to the liner holder and the wear liner and they are driven out of the cylindrical pressure chamber together under pressure. A new wear liner is placed in position inside a liner holder and driven into place inside the cylindrical pressure chamber of the press by the internal pressure intensifier, which is combined with special tools. In the wire-wound press described in PCT/SE95/000153 both the interior of the cylindrical pressure chamber and the exterior of the liner holder are slightly conical in their cylindrical shape, shown schematically as prior art in FIG. 1. The interior of the liner holder is cylindrical in shape. The wear liner is placed in the liner holder as a shrink fit. When the liner holder with the wear liner placed inside it is driven into the cylindrical pressure chamber of the press they become compressed and thereby pre-stressed in the radial direction in order to withstand high pressures under use.

As stated above, liner failure can arise after some time in operation. A feature of the wear liner described in PCT/SE95/000153 is that it is a very thin walled cylinder. This is designed such that in the event of a liner fracture, the additional force that might overload the press frame, which force is proportional to the cross section of the wear liner, is small. This means that the additional force due to the fracture can be safely confined within the press avoiding expensive or dangerous damage to the press or its surroundings.

A further feature of the wear liner described in PCT/SE95/000153 is that it has a means on the outside of the wear liner, for example a spiral groove cut along the whole length of the outside surface of the wear liner. Thus, if a wear liner should crack or split in service, then pressurized medium from the high pressure chamber leaks out of the wear liner. The pressurized medium that has leaked is conducted to the outside of the press via a groove or other means in the outer envelope surface of the wear liner. This indicates that a crack or split in the wear liner has occurred and that appropriate action must be taken and the wear liner replaced.

A disadvantage with the wear liner described in PCT/SE95/000153 is that it has to be mounted inside a wear liner holder, a cylinder with a conical exterior, which is expensive to manufacture. Its use is limited to presses with an internal pressure intensifier or a piston similarly capable of driving the wear liner in and out of the press. It is a lengthy and difficult process to remove the wear liner, as the wear liner and the liner holder have to be driven out of the press by the internal pressure intensifier combined together with special tools. The wear liner with the liner holder is also lengthy and difficult to install, as it has to be carefully driven into the press using the internal pressure intensifier together with special tools in order to position the conical liner holder, with the wear liner inside it, inside the cylindrical pressure chamber in a pre-stressed condition.

In addition to the wire-wound pre-stressed press of the type described in PCT/SE95/000153 there are alternate designs for high pressure presses. High pressure presses may or may not have cylindrical pressure chambers that are pre-stressed. For example, a sufficiently thick steel cylinder may be used as the cylindrical pressure chamber of a high pressure press without pre-stressing. However, this type of press requires frequent safety inspections for signs of damage when operated at higher pressures. Damage to such thick, heavy cylindrical pressure chambers entails expensive repairs or replacements.

BRIEF SUMMARY OF THE INVENTION

It is an object of the invention to provide a high pressure press with a wear liner that is arranged in a state of residual radial compressive stress. It is a further object of the invention to provide a wear liner for a high pressure press that is easy to replace and is less expensive to manufacture. It is a still further object of the invention to manufacture a high-pressure press that comprises a wear liner that may be easily removed.

These and other objects are achieved according to the invention by a replaceable wear liner with a slightly undersized outside diameter when compared to the inside diameter of a cylindrical pressure chamber. It is inserted into the cylindrical pressure chamber of a press without driving it in under the application of pressure. Once in position inside the cylindrical pressure chamber, it is fixed in place by expanding it radially under excess pressure. The wear liner is shaped as a thin walled circular cylinder which may be easily removed using a method described in the claims and below.

The wear liner is inserted into the cylindrical pressure chamber of the press. Once placed inside the cylindrical pressure chamber of a press the wear liner is fixed in place by the application of radial pressure to the inside of the wear liner. This is carried out by closing the press and applying a pre-calculated excess radial pressure to the wear liner inside the press. This plastically deforms the wear liner leaving it with a residual compressive stress that acts as a radial pre-stress to withstand the high pressures generated in use.

To remove the wear liner according to the present invention the press is opened so that the wear liner may be accessed. A milling cutter or other tool is introduced inside the wear liner and used to make a series of longitudinal cuts inside the wear liner. The cuts are made to a pre-determined depth, running the whole length of the wear liner, deep in the wear liner material but without penetrating through the wear liner material and damaging the liner holder or innermost cylinder. The specially adapted milling cutter makes a cut which is approximately square in cross section. Although the cuts are preferably square in cross section it is within the scope of the invention to make cuts of a different cross section.

Sufficient material is removed from the wear liner by the approximately square cuts that the remaining thin layer of wear liner material at the bottom of the cut is sufficiently wide that it acts as a kind of hinge. The thin layer or hinge buckles under the radial pre-stress compressive force remaining in the wear liner allowing the walls of the wear liner to collapse together.

When the cuts have been completed and the wear liner has collapsed inwards into the cuts it can then be removed easily from the liner holder or cylindrical pressure chamber without the use of pressure. After the old wear liner has been dismantled and removed a new wear liner can be put in place quickly and easily.

By providing a wear liner according to the invention, an economical high pressure press is achieved. The press can have a relatively simple design as shown schematically in FIG. 3. The cylindrical pressure chamber 3 may be manufactured as a cylinder from a single piece of solid steel. The cylindrical pressure chamber may alternatively be specially treated using, for example, an autofrettage process to provide a harder, stronger and radially pre-stressed region in the inner part of the cylinder. In such a one-piece cylinder design the wear liner may fit directly inside the cylindrical pressure chamber without any intermediate cylinder or wear liner holder.

A high pressure press comprising a replaceable wear liner according to the invention may be used for the treatment of substances, as in PCT/SE95/000153. Such a press may also be used for the isostatic pressing of powder pre-forms, to compact objects produced from powder or sintered forms. Such a press may also advantageously be used for consolidation of castings. Many castings contain internal cracks or other flaws following the casting process. Isostatic pressure treatment in such a press may be used to close up internal flaws thus consolidating the material of castings.

The advantages of this invention are many. The complete operation of changing the wear liner takes very little time and so may be planned with the minimum disruption to production requirements. The invention can be inserted, removed, and replaced in high pressure presses without the application of pressure to drive it in or out. The invention does not require an internal pressure intensifier or other piston with or without special tools to drive it in or drive it out of the press. This is simpler, quicker and removes the risk of accidental damage due to the inaccurate or wrong application of pressure by mistake. The invention is less expensive to manufacture in the embodiment of a regular circular cylindrical form, compared to the cost of making pressure cylinders with conical bores and wear liner holders with conical outer diameters.

The invention can be incorporated in other types of high pressure presses, in addition to the type of press described in PCT/SE95/000153. The present invention may be used in high pressure presses designed with or without pre-stressed cylindrical pressure chambers, presses with or without an internal pressure intensifier, and presses with wire-wound cylindrical pressure chambers or presses with solid cylindrical pressure chambers. Because the present invention is so widely applicable it is expected to be manufactured in relatively greater numbers with the implicit cost reduction that that involves.

The present invention enables high pressure presses to be operated at a higher pressure within their respective design pressure. The use of a wear liner with the features disclosed in PCT/SE95/000153 means that close safety inspections of a pressure cylinder are not required as frequently since the wear liner is both easily changed and also indicates when damage or wear has taken place, as also described below.

BRIEF DESCRIPTION OF THE SEVERAL VIEWS OF THE DRAWINGS

The present invention will be described in more detail in connection with the enclosed drawings.

FIG. 5 shows cuts being made inside a wear liner according to the present invention prior to removing it from a high pressure press.

FIG. 6 shows a dismantled wear liner according to the present invention being removed from a high pressure press.

DETAILED DESCRIPTION OF THE INVENTION

A replaceable wear liner according to the present invention is shaped as thin-walled circular cylinder, although other cylindrical shapes are within the scope of the invention. The outside diameter of a wear liner according to the present invention is slightly undersize compared to the inside diameter of the cylindrical pressure chamber or liner holder of a high-pressure press 3.

Figure 1:
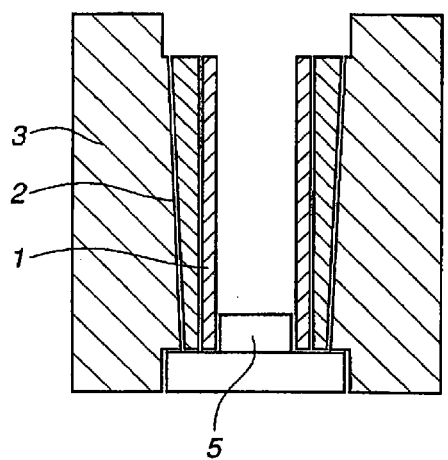
FIG. 1 shows the prior art schematically with a wear liner and a wear liner holder of a high pressure press.
Figure 2:
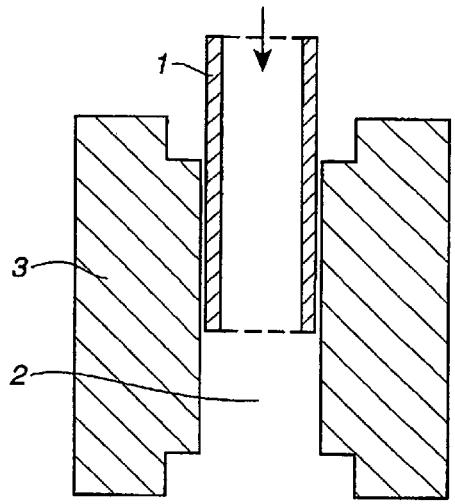
FIG. 2 shows schematically a wear liner according to the invention being inserted into the cylindrical pressure chamber of a high pressure press.
Figure 3:
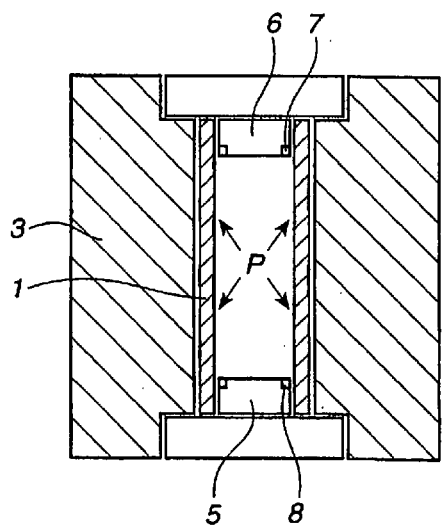
FIG. 3 shows a wear liner according to the invention being expanded and radially pre-stressed inside the cylindrical pressure chamber of a high pressure press.
Figure 4:
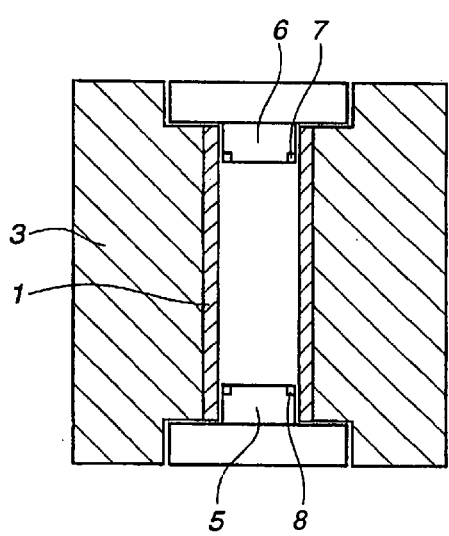
FIG. 4 shows a wear liner according to the invention in position in the cylindrical pressure chamber of a high pressure press.

The wear liner 1 shown in FIG. 2 is inserted in the cylindrical pressure chamber 2. Once placed inside the cylindrical pressure chamber 2 the wear liner is fixed in place by the application of an excess radial pressure. This is carried out by closing the press 3 and applying a pre-calculated excess pressure to the wear liner inside the press 3, as shown schematically by letter "P" in FIG. 3. This plastically deforms the wear liner leaving it with a residual compressive stress that acts as a radial pre-stress against the high pressures generated in use inside the press 3.

The wear liner 1 is put in place inside the cylindrical pressure chamber 2 inside the press 3. Two end caps 5, 6 are placed in position at either end of the wear liner. The end caps 5, 6 are each equipped with a temporary sealing means in the form of temporary undersize end cap seals 7, 8 which fit inside the ends of the wear liner 1. The inside diameter of the wear liner is undersize when first fitted, which means that the end cap seals 7, 8 have to be of a slightly smaller diameter than seals for normal service. When the end caps 5, 6 have been positioned, pressure may be applied inside the wear liner, by means of fluid under pressure supplied by an external pressure source delivered by means such as a pipe (not shown) arranged to pass through an end cap 5, 6.

Under sufficient excess pressure, above the yield point of the material, the wear liner is deformed and permanently expanded to a pre-calculated degree. The pressure is released. The end caps 5, 6 are removed. The end parts of the wear liner that were adjacent to the end caps and which were not under pressure may have a smaller inside diameter than the main part of the wear liner which was exposed to pressure. When necessary, the inner surface of the undeformed regions of the wear liner adjacent to the end caps may be machined to increase the inside diameter so that it is the same as the rest of the wear liner. The machining can be done before or after the expansion of the wear liner.

A wear liner according to the invention may be removed, either because of a crack or a fracture failure or as part of a planned maintenance operation, as follows.

One or both end caps 5, 6 with seals 7, 8 of the high pressure press 3 are removed, depending on the type of press 3. A milling cutter 9 or other type of cutting, milling or grinding tool is arranged to be lowered into the wear liner 1 as shown in FIG. 5.

The milling cutter 9 is operated so as to make a series of longitudinal cuts 10 running the whole length of the liner. Usually four cuts distributed approximately evenly around the circumference provide sufficient effect. Fewer or more cuts may be used depending on the diameter of the wear liner. The cuts are made to a pre-determined depth, as deep as possible in the wear liner material, leaving a thickness of between 1–10% and preferably between 1–5% of the diameter of the wear liner diameter in place.

After the cuts have been made and the specially adapted milling cutter removed the collapsed wear liner 11 can then be removed quite easily from the cylindrical pressure chamber 2 and lifted clear with a standard lifting apparatus as shown in FIG. 6. After the old wear liner has been dismantled and removed a new wear liner can be quickly and easily put in place as described above.

From the foregoing it will be appreciated that, although specific embodiments of the invention have been described herein for purposes of illustration, various modifications may be made without deviating from the spirit and scope of the invention. For example, it will be understood that the various components and steps of the systems described above may be used in various combinations with each other. Accordingly, the invention is not limited except as by the appended claims.

What is claimed is:

1. A method of installing a replaceable wear liner within a pressure chamber of a high pressure press, the method comprising:

inserting the wear liner into the pressure chamber;

subjecting the wear liner to an increased pressure by providing fluid communication between an external pressure source and the pressure chamber to expand the wear liner, the wear liner being directly exposed to the fluid and subjected to the increased pressure;

exceeding the tensile yield strength of the wear liner with the increased pressure thereby; and releasing the pressure within the expanded wear liner to obtain a state of residual compressive stress in at least a portion of the wear liner.

2. The method according to claim 1, comprising:

replacing the wear liner by making at least one cut to the inner surface of the wear liner, the cut being made to the portion of the wear liner that is in the state of residual compressive stress;

allowing the wear liner to collapse due to the residual compressive stress stored within at least the portion of the wear liner; and removing the collapsed wear liner from the pressure chamber.

3. The method according to claim 2 wherein the cut is approximately square in cross section.

\* \* \* \* \*